UNITED STATES PATENT OFFICE.

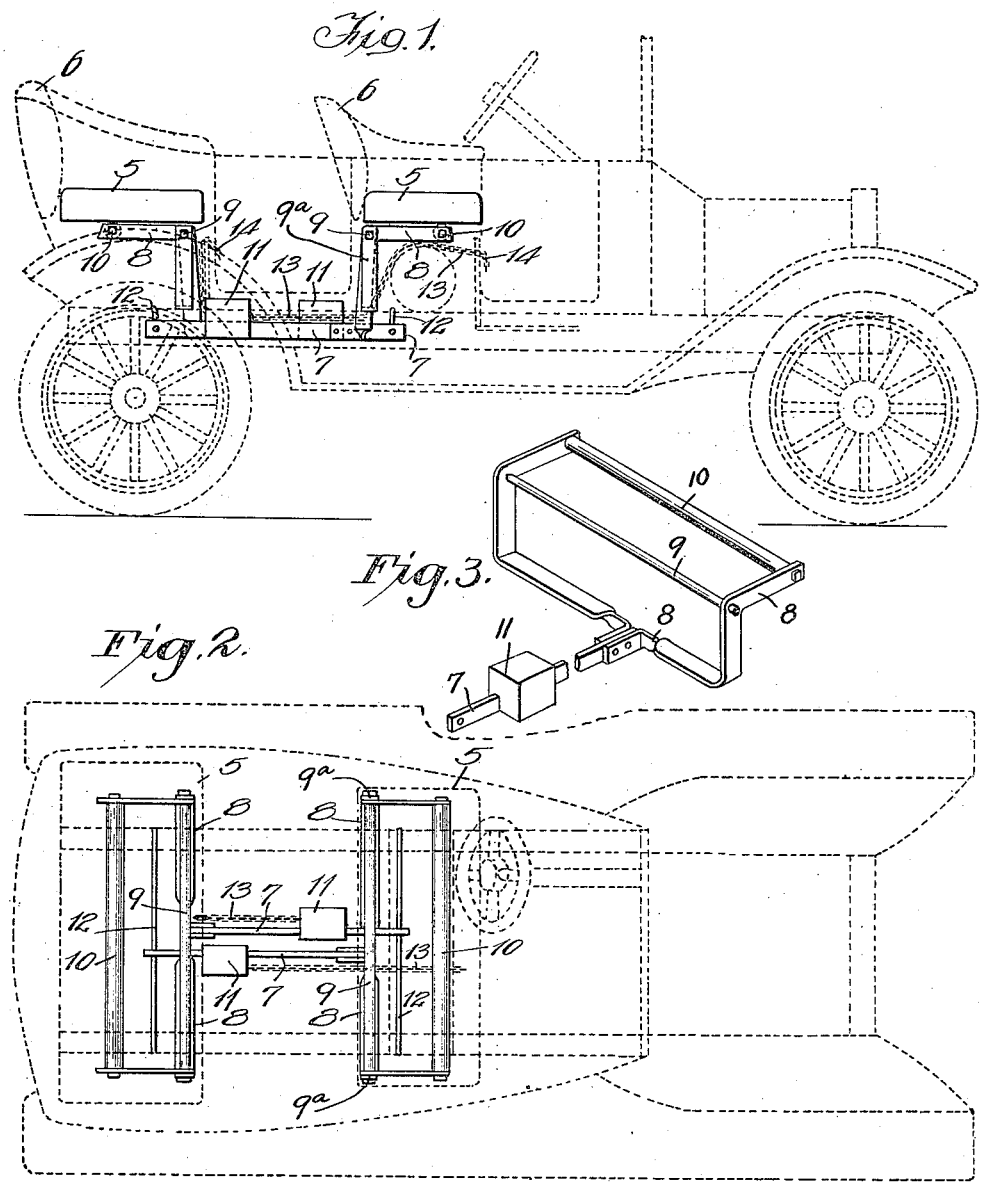

HARRY HOWE, OF STOUGHTON, WISCONSIN.

SHOCK-ABSORBING MEANS FOR VEHICLES.

1,375,512.   Specification of Letters Patent.   Patented Apr. 19, 1921.

Application filed October 7, 1918. Serial No. 257,149.

*To all whom it may concern:*

Be it known that I, HARRY HOWE, a citizen of the United States, residing at Stoughton, in the county of Dane and State of Wisconsin, have invented certain new and useful Improvements in Shock-Absorbing Means for Vehicles, of which the following is a specification.

This invention relates to a shock absorbing means for vehicles of all kinds such as automobiles, ambulances, trucks, or other carriages, and the general object of the invention is to provide improved means for minimizing road shocks upon the load carriers of such vehicles whether such carrier be the seat of an automobile or the like, a bed in an ambulance, or other support for a passenger or freight load.

Pursuant to this general object, it is an object of the invention to combine with a vehicle having a seat or other load carrier which is movable up and down, means for translating the sharp shocks or vibrations of the vehicle into a slow or gradual rising and falling movement of the seat or carrier, and to this end the invention provides a lever-like means for supporting the carrier and for counterbalancing the weight of the carrier and the load thereon, said means allowing the carrier to move slowly up and down but acting to absorb all sudden thrusts, jars and vibrations of the vehicle caused by passing over uneven roads.

Another object of the invention is to provide a shock absorbing means of the character described which is in the form of an attachment that may be readily applied to existing automobiles.

Further objects and advantages, and objects relating to details of construction will be fully set forth in the following description.

In the accompanying drawing Figure 1 is a side elevational view of a shock absorbing means embodying my invention, the vehicle, in this instance an automobile, which carries said means being indicated in dotted lines. Fig. 2 is a top plan view of Fig. 1. Fig. 3 is a perspective view of one of the lever-like devices which supports a seat.

My invention is susceptible of embodiment in many different forms and is adapted for use upon various vehicles and in various ways. I have herein shown one exemplary embodiment of the invention in connection with an automobile but I will have it understood that no limitation is thereby intended and I aim to cover in the appended claims all equivalents and alternative constructions falling within the scope of the invention. I believe myself to be the first to provide a vehicle having a load carrier which is movable up and down with respect to the remainder of the vehicle in combination with means for supporting such carrier and for counterbalancing the weight of the carrier and the load.

The automobile which is illustrated in the drawings is a two-seated car. The seats proper are designated 5 and are arranged to be movable up and down with relation to the backs 6 and the remainder of the car. When the shock absorbing means is in the form of an attachment to be applied to existing cars the seat 5 may be the loose cushion ordinarily found in automobiles.

In the present instance each seat, that is the front and rear, is provided with a separate shock absorbing means. Each means in the preferred form shown comprises a lever-like device 7 which has at one end a pair of diverging irregularly shaped arms 8 that extend first upwardly and then horizontally to underlie the seat 5. The arms are pivoted at their angles at 9 to a suitable support on the body of the car. In the present instance the said arms are supported in a pair of stationary upstanding brackets 9$^a$ fixed to a suitable part of the car beneath the seat. Preferably the free ends of the arms are connected by a roller 10 upon which the seat rests.

The single arm of the lever extends beneath the bed of the car and on this arm is slidably or adjustably mounted a counterweight 11. That portion of the lever-like device as a whole, which underlies the seat, is preferably much shorter in extent from its pivot 9 than the opposite portion of the device. The counterweight therefore, being mounted on the longer arm of the lever as a whole, may be of less weight than the seat and its occupant and still effectively counterbalance the latter. A further advantage of providing a long lever arm is that the lever as a whole, will vibrate up and down more slowly.

If desired, means may be provided for limiting the pivotal movement of the lever. In the present instance I have shown by way of example a connection 12 in the form of a flexible cable or chain which has its ends attached to opposite sides of the vehicle frame or body, the mid-portion of the connection passing through a hole in the lever 7 and the connection having sufficient slack to allow up and down movement of the lever 7 but limiting the extent of such movement as desired.

Means is preferably provided for adjusting the counterweight along the lever and this means in the preferred embodiment is operable from a position close to the seat so that the weight may be adjusted without getting out of the car. The purpose of adjustment is to set the counterweight to accommodate persons of different weight who may occupy the seat. The means herein shown for adjusting the weight comprises a flexible connection 13 attached to the weight and extending to a position in front of and beneath the seat where it may be secured to an anchor 14 and may be readily grasped. The counterweight normally tends to move toward the free end of the lever so that it is not necessary to provide means for moving the counterweight toward such end.

The long arm of the lever for the front seat extends rearwardly from its pivot and the long arm of the lever for the rear seat extends forward from its pivot, said two long arms overlapping each other beneath the floor of the car. Said arms may be positioned at any suitable place with regard to the center line of the car depending upon the location or relationship of the drive shaft, exhaust pipe, muffler, and other devices beneath the body of the car.

In operation the sudden jars, shocks, or vibrations which are imparted to the body of the car in passing over uneven roads are not communicated to the seats 5 but such shocks or vibrations merely cause the lever to swing slowly up and down about their pivots with the result that the occupant of the seat receives no shock. The seat follows the movement of the occupant so that even in violent recoils of the car the seat rises with the occupant and retards his descent. Preferably the counterweight is set so that it does not wholly counterbalance the seat and its occupant. The weight of the occupant will then normally hold the seat end of the lever down.

I claim as my invention:

1. The combination with an automobile having a movable seat, of a lever-like device fulcrumed between its ends on the automobile and adapted to support said seat at one side of its fulcrum, said device being counterweighted at the other side of its fulcrum to counterbalance the weight of said seat and the occupant thereof.

2. The combination with an automobile having a seat which is movable up and down, of a shock absorbing means comprising a lever-like device pivoted between its ends to the frame or body of the automobile, one end of said lever device being arranged to support said seat and a counterweight adjustably mounted on the other end of said lever device and adapted to be moved to wholly or partially counterbalance loads of different weight on said seat.

3. The combination with an automobile having a seat which is movable up and down, of a shock absorbing means comprising a lever, one end of which has two branches underlying opposite ends of said seat and supporting the latter, said lever being pivotally supported between its ends from the body or frame of the automobile, and a counterweight slidably mounted on the opposite or single arm of said lever and arranged to counterbalance the weight of the occupant of said seat.

4. The combination of a vehicle having a seat which is movable up and down with relation to the remainder of the vehicle, a lever-like device pivoted on the vehicle and supporting said seat, said device being counterweighted to wholly or partially balance the weight of the seat and the load thereof, and means operable from said seat for adjusting the counterweight to suit the weight of the load on said seat.

5. The combination of a vehicle having a load carrier which is movable up and down with relation to the remainder of the vehicle, a lever-like device pivoted on the vehicle and supporting said carrier, said device being counterweighted to wholly or partially balance the weight of the carrier and the load thereof, and means for limiting the swinging movement of said device.

6. In a vehicle, the combination of a movable seat, and a counterweighted lever-like device pivotally mounted on the vehicle and having a limited range of movement, said device being operatively connected to said seat and permitting it to rise and fall within its range of movement, thereby effecting a cushioning of vibrations of the vehicle imparted to the seat.

7. In a vehicle, a load carrier and a weight both movable up and down, and a connection constraining them to move simultaneously in opposite directions, said weight being adjustable in relation to said carrier so that said carrier when loaded slightly overbalances said weight.

8. In a vehicle, a seat and a counterweight both movable up and down, within a limited range, and a lever connecting said seat and counterweight and having its fulcrum therebetween upon said vehicle, said weight being adjustably positioned upon said lever so that said seat when occupied slightly overbalances said weight.

In testimony whereof, I have hereunto set my hand.

HARRY HOWE.